No. 625,478. Patented May 23, 1899.
J. C. UHLENBROCK.
PROCESS OF AND APPARATUS FOR MAKING ARTIFICIAL BUTTER.
(Application filed July 12, 1897.)
(No Model.) 2 Sheets—Sheet 1.
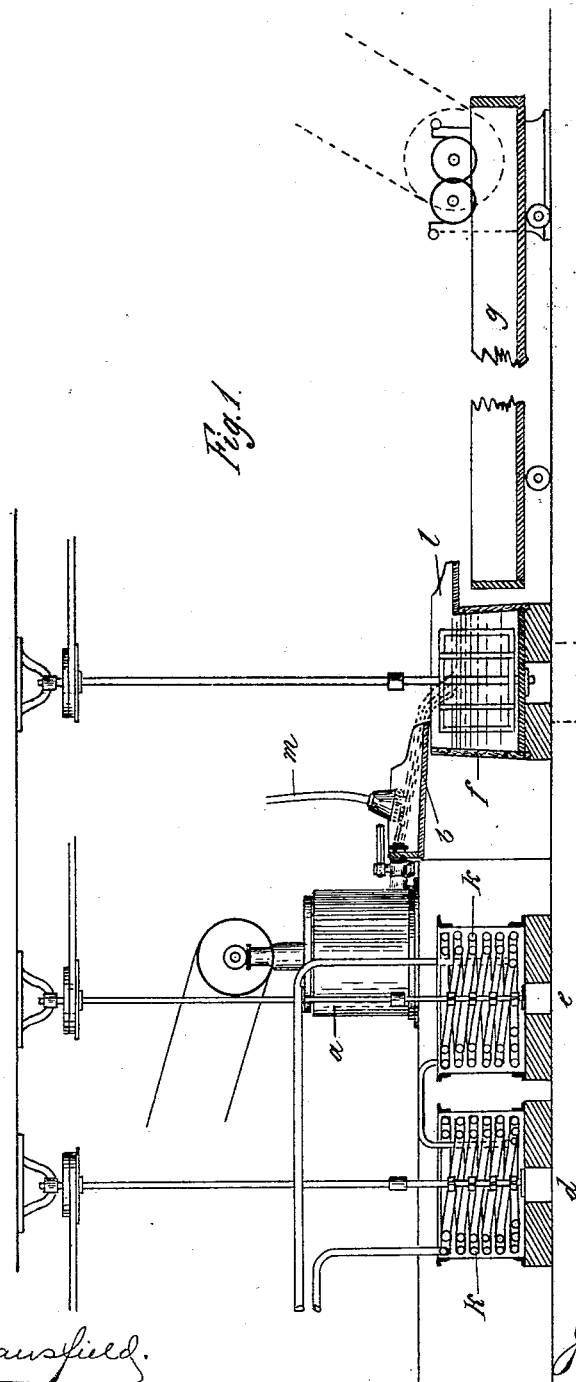

No. 625,478. Patented May 23, 1899.
J. C. UHLENBROCK.
PROCESS OF AND APPARATUS FOR MAKING ARTIFICIAL BUTTER.
(Application filed July 12, 1897.)
(No Model.) 2 Sheets—Sheet 2.
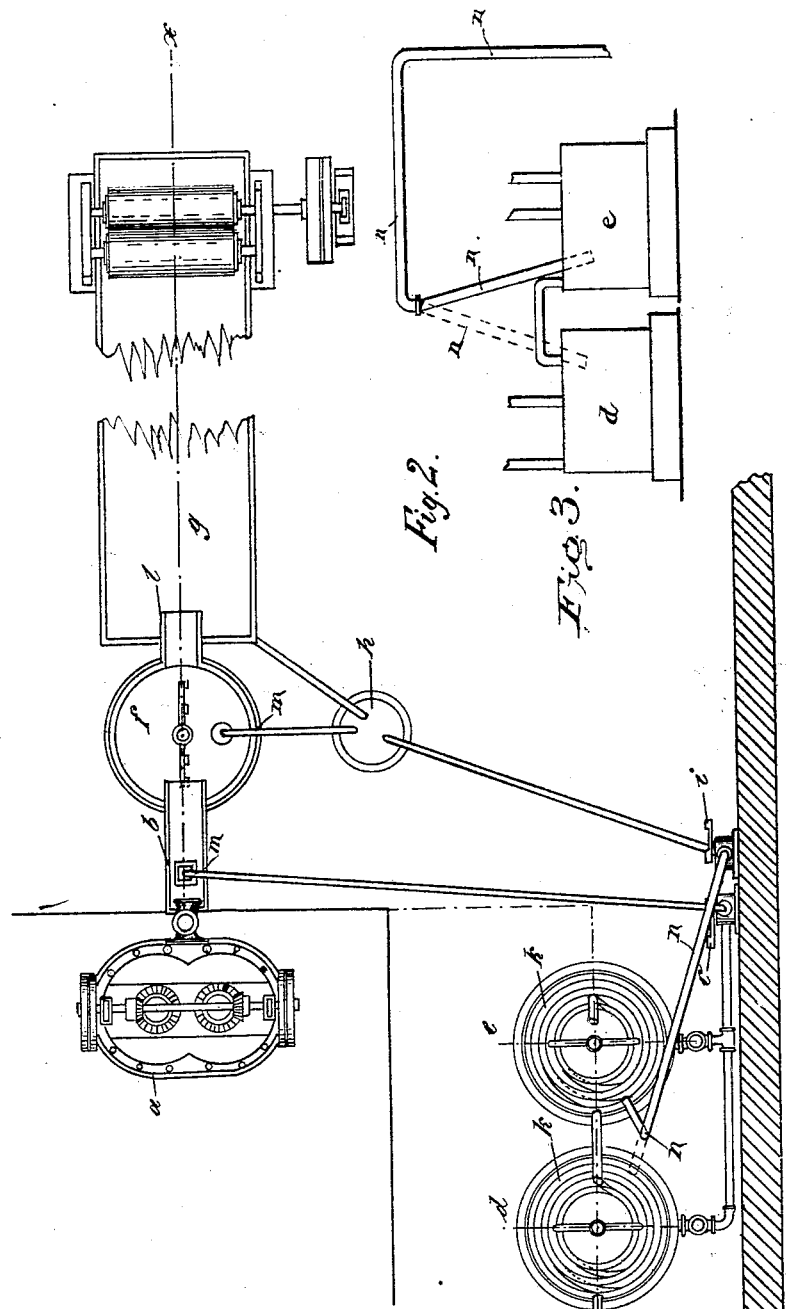

UNITED STATES PATENT OFFICE.

JAN CHRISTOFFEL UHLENBROCK, OF NEUSS, GERMANY.

PROCESS OF AND APPARATUS FOR MAKING ARTIFICIAL BUTTER.

SPECIFICATION forming part of Letters Patent No. 625,478, dated May 23, 1899.

Application filed July 12, 1897. Serial No. 644,321. (No model.)

*To all whom it may concern:*

Be it known that I, JAN CHRISTOFFEL UHLENBROCK, of Neuss, in the Kingdom of Prussia and German Empire, have invented Improvements in Methods of and Apparatus for the Manufacture of Artificial Butter, of which the following is a specification, reference being had therein to the accompanying drawings.

In the manufacture of margarin or butter substitute as at present generally carried out the material as it leaves the churn is treated with a jet of cold water. This treatment involves the disadvantages that the margarin cannot be produced with a sufficient flavor, that it loses the pleasant taste given to it by the previous treatment with milk, that the margarin thus becomes too bright or shining as compared with butter, and that impurities and deleterious matter may be introduced, since many manufacturers are compelled to use water quite unfit for employment in the preparation of an article intended for human food. As the result of especial efforts to obviate the disadvantages referred to and to produce a substitute more nearly resembling pure butter in flavor, consistency, and appearance I have been led to adopt the hereinafter-described method and apparatus, which produce excellent results.

In proceeding according to this invention instead of effecting the crystallization of the product as it leaves the churn by means of a jet of cold water I effect it by means of cooled skimmed milk or buttermilk.

In carrying out my improvements I employ the apparatus and appliances illustrated by the accompanying drawings and hereinafter referred to.

Figure 1 represents a sectional side elevation; Fig. 2, a plan, and Fig. 3 is a detail.

In carrying out my invention I place within the churn $a$ oleomargarin, sesamoil, cottonoil, peanut-oil, and cold buttermilk or combinations of these or other ingredients, such as commonly used in the production of oleomargarin or artificial butter, as I do not claim in the present instance the composition employed in manufacturing the artificial butter, because my present invention can be adapted in nearly all known processes for the manufacture of artificial butter. When all the ingredients have in the ordinary manner been placed in the churn $a$ and sufficiently churned, the mixture is allowed to run out into the trough $b$, where a jet of cooled skimmed milk or buttermilk impinges upon it. The skimmed milk or buttermilk is derived from one of the cooling-tanks $d$ $e$ and forced through the jet upon the material by the pump $c$. The mass, stiffened in the trough $b$, is conveyed into the tank $f$, which contains a stirring apparatus, as indicated. This stirrer is kept in slow motion, so that the stiffened product is again churned, but this time with the skimmed or butter milk. The margarin leaves the tank $f$ by the spout $l$, whence it drops into the carriage $g$, which may be of the known construction. The surplus or unabsorbed skimmed milk or buttermilk flows from the tank $f$ and the carriage $g$ through suitable pipes into the receiving-tank $h$, whence it is returned by the pump $i$ through a flexible or swinging pipe $n$ to the cooling-tanks $d$ $e$, where it is cooled by the worms $k$, which are connected by pipes with a freezing or cooling apparatus. The pipe $n$ is of such construction that the operator can direct the unabsorbed skimmed or butter milk into either tank $d$ or $e$ at will. The circulation of the skimmed milk or buttermilk through the trough $b$, the tank $h$, and back to the cooling-tank $d$ or $e$, whence it started, is continued until the churn is empty. The milk is used over and over again without the addition of any fresh supply, and in consequence of its coldness the margarin loses none of its taste or flavor. It may safely be used six or eight times in a single day. The milk remaining at night after repeated use may be utilized on the following day in the production of an inferior kind of margarin.

Among the advantages resulting from my improvements may be mentioned: The flavor given to the margarin by the usual addition of fresh milk to the contents of the churn is not lost. The margarin more nearly resembles pure butter in appearance and is of more uniform quality, while being at the same time less sensitive to changes in temperature. Its keeping quality is increased, the cost of its production is diminished, and the spots which appear in ordinary margarin after about a fortnight are avoided. In the manufacture no cream and less ice is needed.

The cooling-tanks $d$ $e$ may be constructed of iron, tinned inside, and the cooling-worm should be tinned outside. In each of these tanks there should be a stirrer, as indicated, as the motion produced by its rotation insures a quicker and more uniform cooling. When more than one of the tanks is used, each of them is provided with a cock to control the outlets. The pumps may be of the paddle type or of other suitable construction. The tank $h$ may be made of sheet-tin, and the tank $f$ and spout $l$ of wood, with metallic edges.

The rollers shown at right-hand side of Figs. 1 and 2 are grooved wooden rollers which are used to work the butter and separate the same from the milk, the milk being conducted from carriage $g$ into the tank $h$ and then returned to pump $i$ to be reused. This part of the device, however, forms no part of the present invention and is not claimed therein.

What I claim, and desire to secure by Letters Patent of the United States, is—

1. The herein-described method of manufacturing butter substitute, consisting in first mixing suitable ingredients in a churn; second, treating the mixture with cold skimmed milk or buttermilk, third, rechurning the mixture with such milk, and finally separating the milk therefrom, whereby the crystallization or stiffening of the artificial butter is effected, substantially as and for the purpose described.

2. An improvement in the manufacture of artificial butter, consisting in first churning or mixing the ingredients to form a butter substitute; second subjecting the mixture to the action of cold skimmed milk or buttermilk, and churning or restirring the mixture in said milk, and finally separating the milk from the mixture, for the purpose and substantially as described.

3. In an apparatus for the manufacture of butter substitute, the combination of a churn, an agitator into which the contents of the churn are discharged, and a cooling-tank into which the milk separated from the butter substitute is discharged, with means for withdrawing the milk from said cooling-tank and directing it with the material into the agitator, substantially as described.

4. In an apparatus for the manufacture of butter substitute, the combination of the churn $a$; a second churn or agitator $f$ into which the contents of the first churn are discharged, and a milk-cooling tank; with means for withdrawing the milk from said cooling-tank directing it into the material as it passes from the first to the second churn, and means for returning the milk separated from the butter substitute in the second churn into the tank, for the purpose, and substantially as described.

5. In apparatus for the manufacture of margarin, the combination and arrangement of a churn $a$, a trough $b$, a second churn or agitator $f$, a pump $i$, a cooling tank or tanks $d$ $e$ connected with the pump $i$, and a second pump $c$ for supplying the contents of the cooling-tanks to the trough $b$, substantially as described.

In witness whereof I have hereunto set my hand in presence of two witnesses.

JAN CHRISTOFFEL UHLENBROCK.

Witnesses:
WILLIAM ESSENWEIN,
ERNEST BUDRÉ.